(12) United States Patent
Meyer

(10) Patent No.: US 8,470,432 B2
(45) Date of Patent: Jun. 25, 2013

(54) HARDSHELL COVER

(76) Inventor: Karl Meyer, Scottsdale, AZ (US)

( * ) Notice: Subject to any disclaimer, the term of this patent is extended or adjusted under 35 U.S.C. 154(b) by 694 days.

(21) Appl. No.: 11/854,447

(22) Filed: Sep. 12, 2007

(65) Prior Publication Data

US 2009/0068410 A1    Mar. 12, 2009

(51) Int. Cl.
  *B32B 3/00*      (2006.01)
(52) U.S. Cl.
  USPC ............ 428/172; 428/156; 428/161; 428/192
(58) Field of Classification Search
  USPC ...... 428/58, 60, 156, 161, 172, 192; 114/361;
    52/80.1, 80.2, 81.1–81.6, 86–89, 200, 245–249,
    52/465–469; 89/36.01, 36.02, 36.11, 36.12;
    296/210, 211, 185.1, 225, 100.02
  See application file for complete search history.

(56) References Cited

U.S. PATENT DOCUMENTS

| | | | | |
|---|---|---|---|---|
| 2,675,740 | A | * | 4/1954 | Barkley ........................ 428/161 |
| 4,891,085 | A | * | 1/1990 | Mulligan ...................... 156/216 |
| 5,120,593 | A | * | 6/1992 | Kurihara ....................... 428/174 |
| 2003/0155792 | A1 | * | 8/2003 | Bohm et al. .................. 296/191 |
| 2006/0188696 | A1 | | 8/2006 | Grose et al. |

\* cited by examiner

*Primary Examiner* — Catherine A Simone
(74) *Attorney, Agent, or Firm* — The Law Firm of Gary F. Witting; Gary F. Witting

(57) ABSTRACT

An exemplary system, method of making, of use, for providing a hard shell cover for covering objects, boats, and like. Hard shell cover is disclosed as comprising, inter alia, a material layer 202, a material layer 204, and a material layer 206, and a transition region. Disclosed features and specifications may be variously controlled, configured, adapted or otherwise optionally modified to further improve or otherwise optimize material and design performance or other material characteristics. Exemplary embodiments of the present invention representatively provide for hard cover components, methods of making and use that may be readily incorporated with existing technologies for the improvement of covers, packaging of objects, form factors, weights and/or other manufacturing, device or material performance metrics.

22 Claims, 10 Drawing Sheets

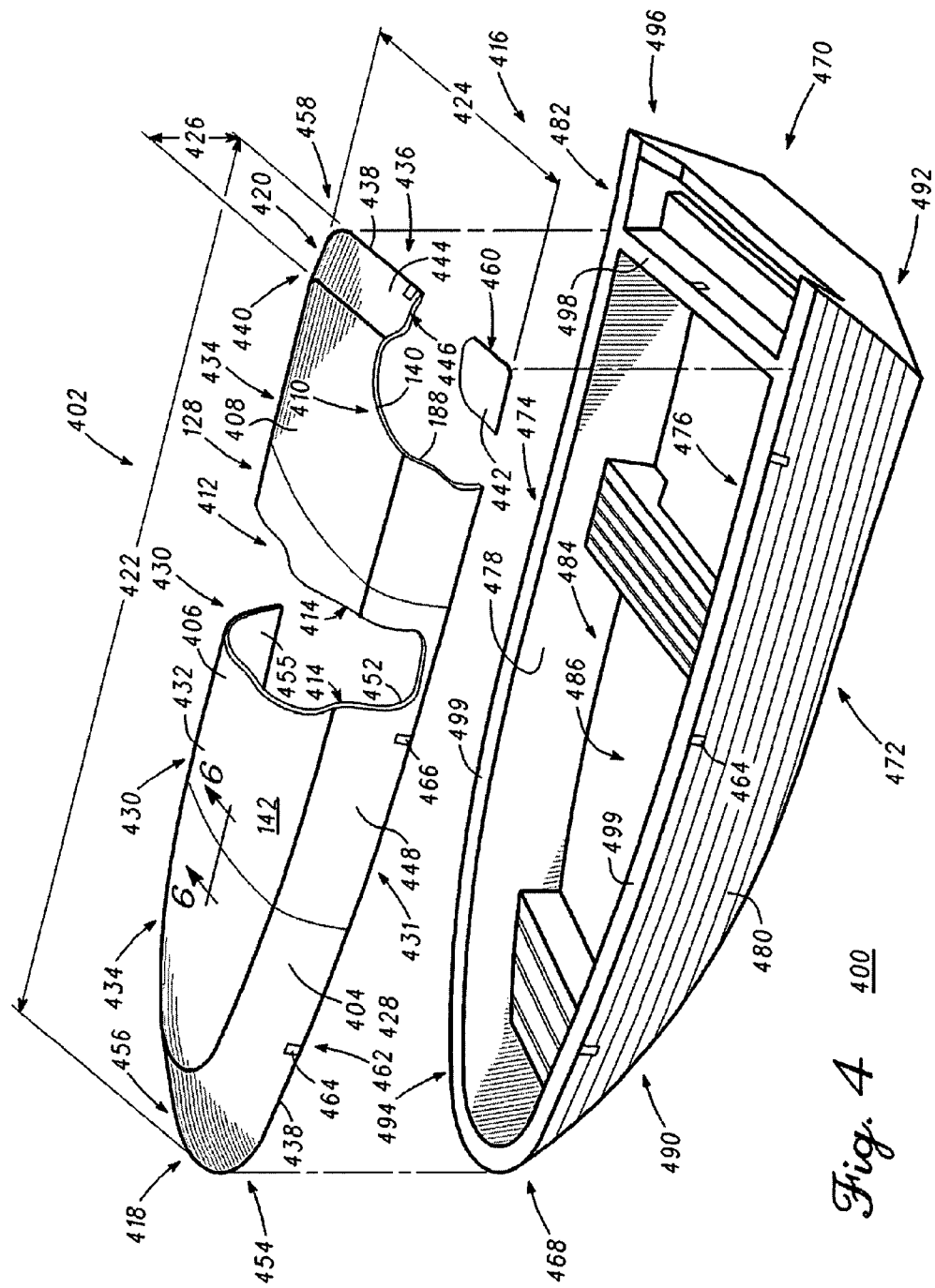

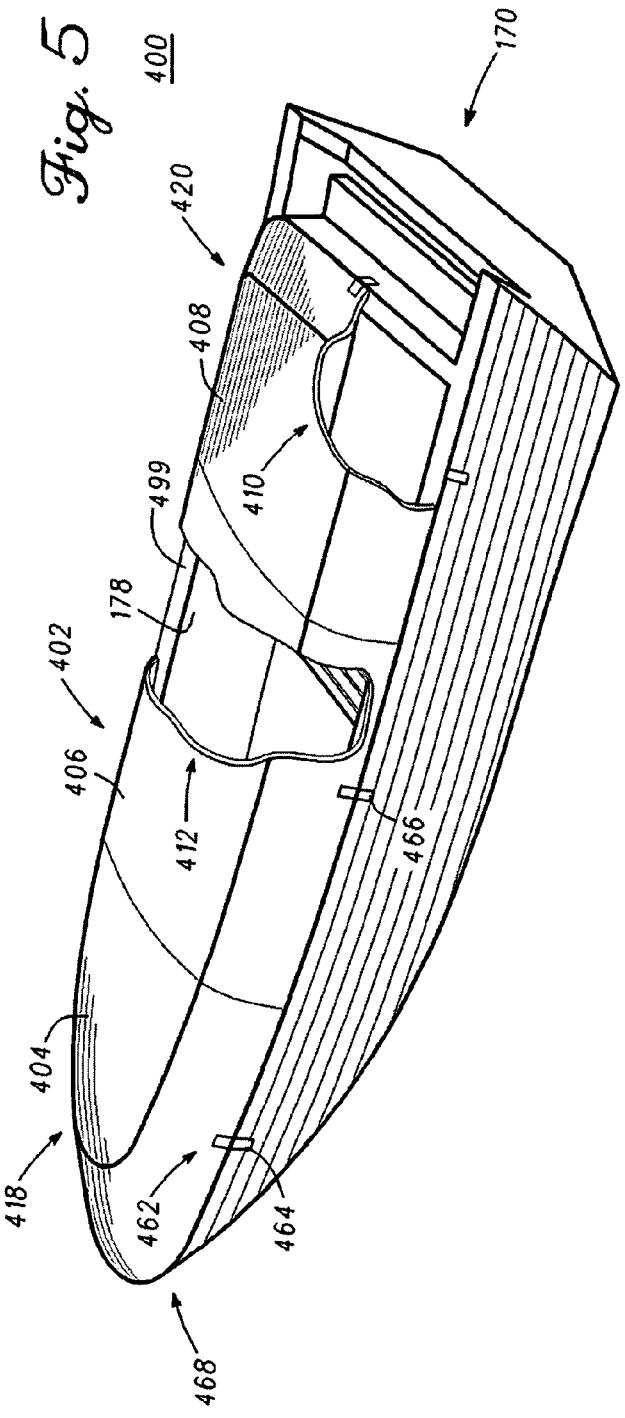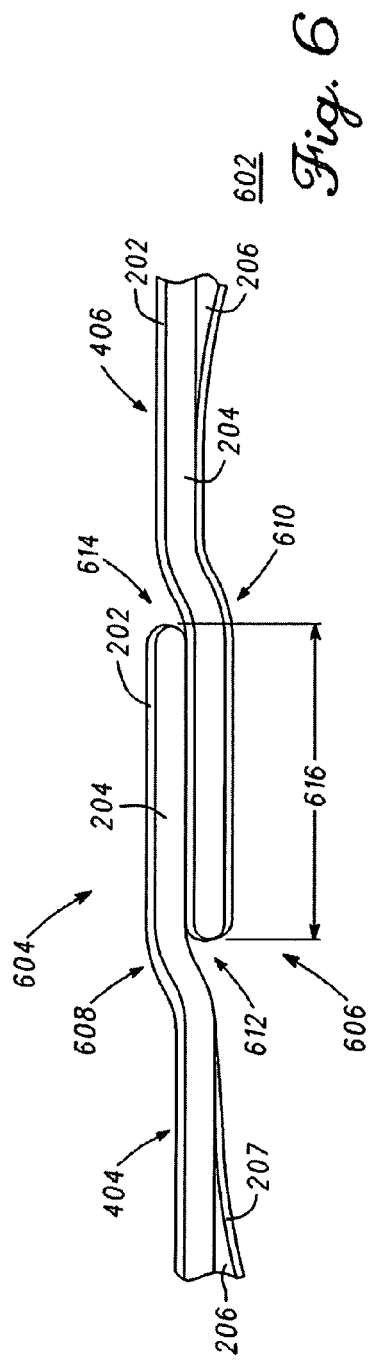

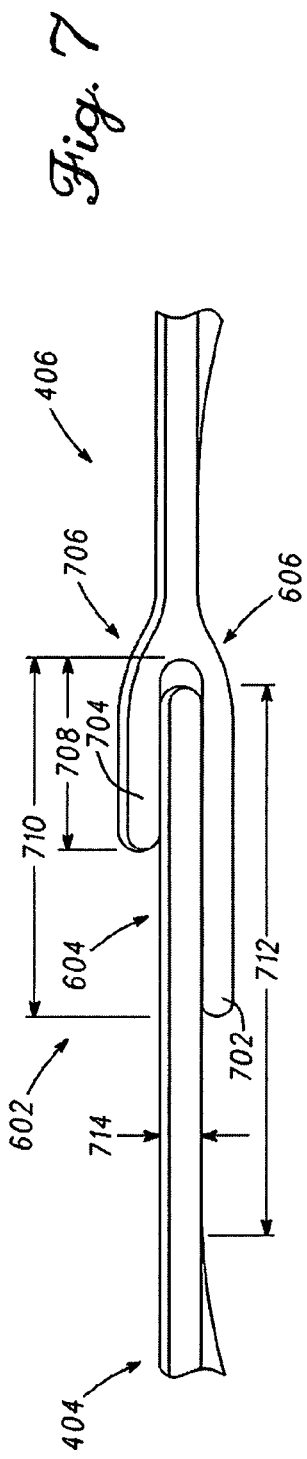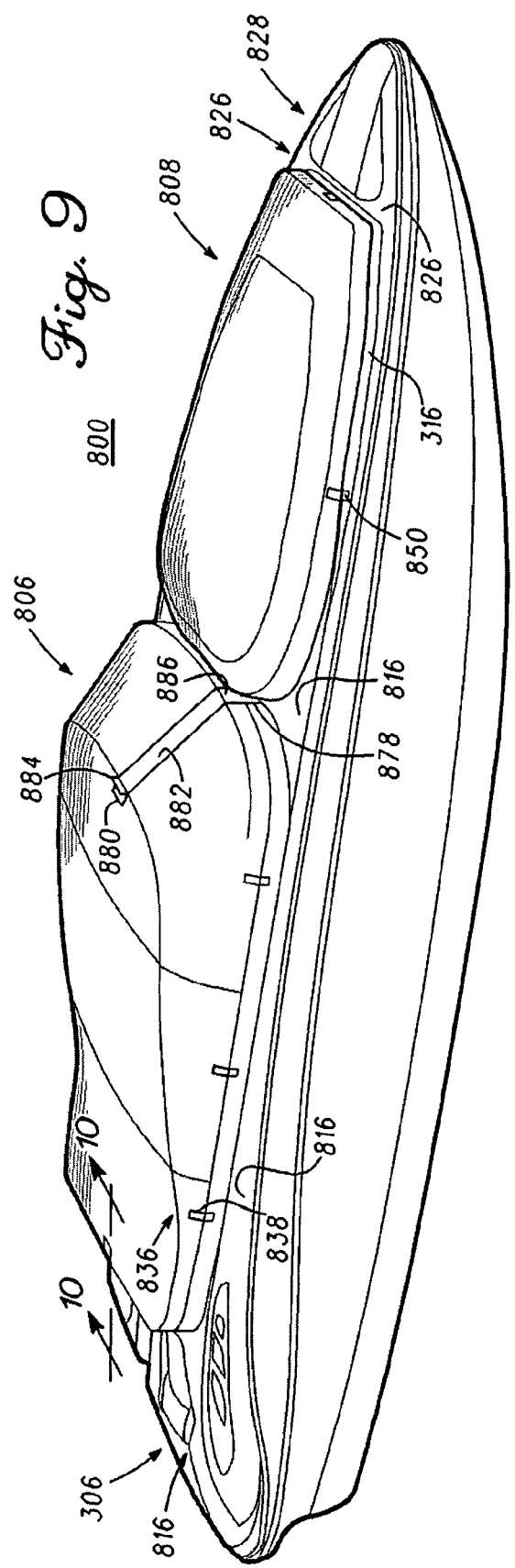

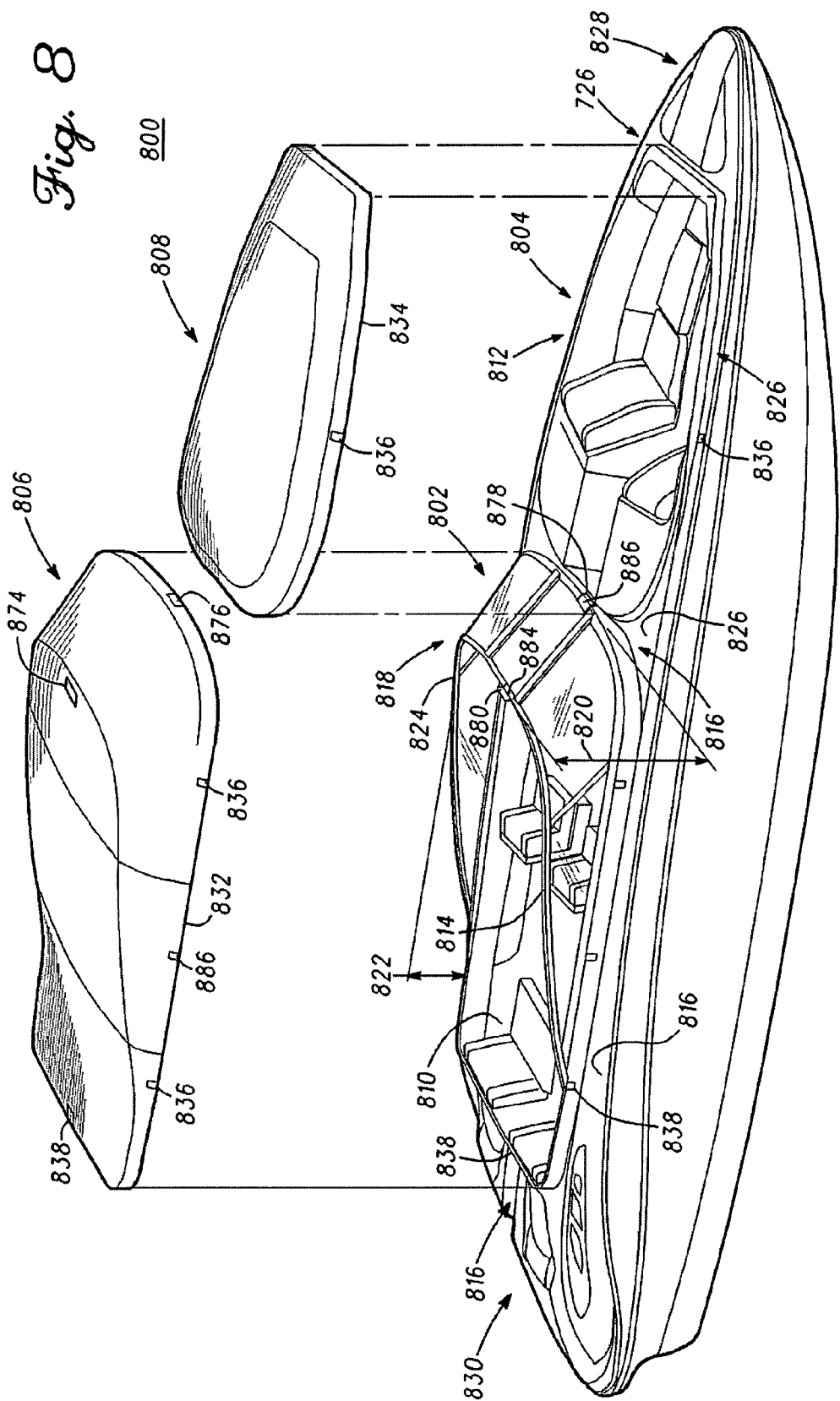

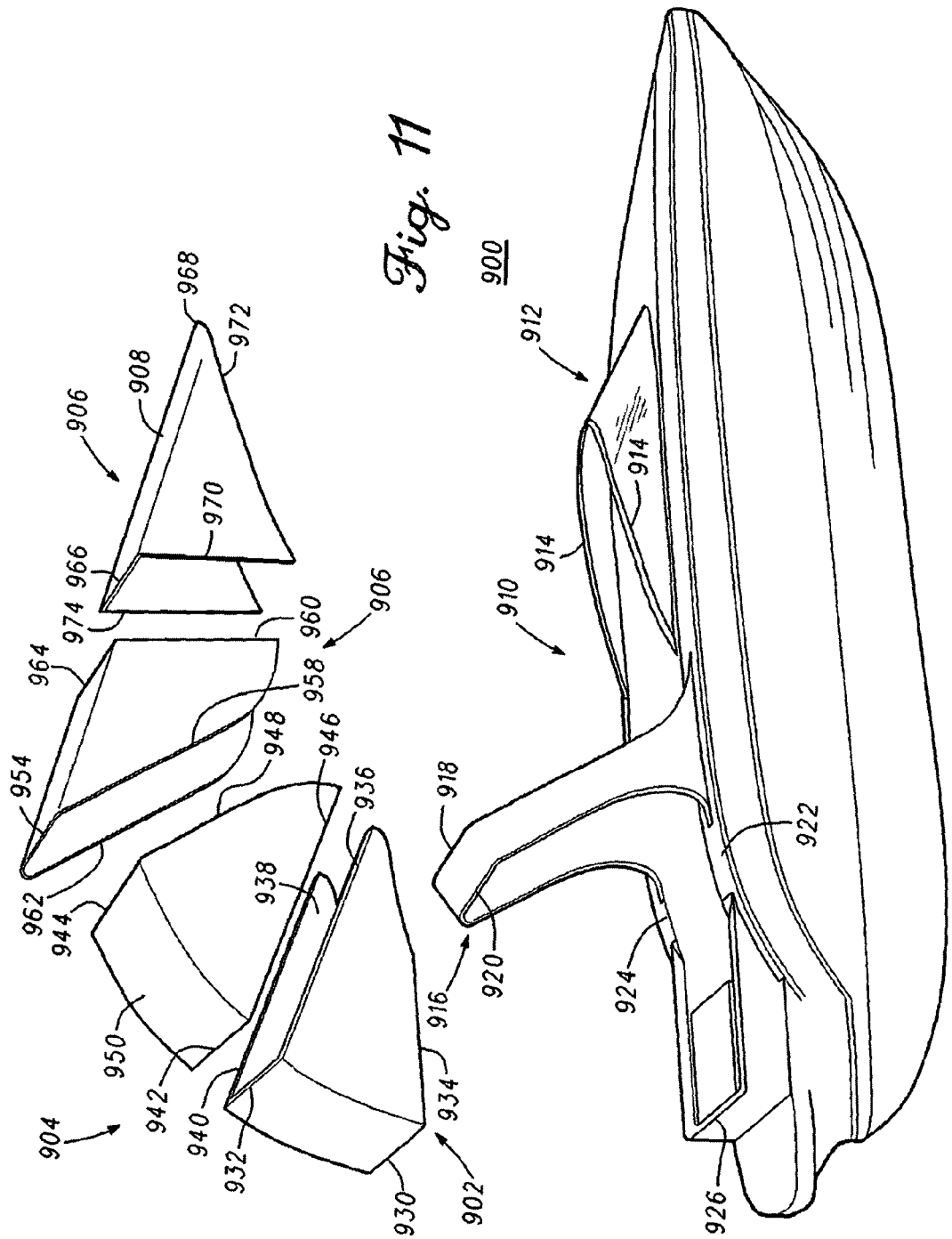

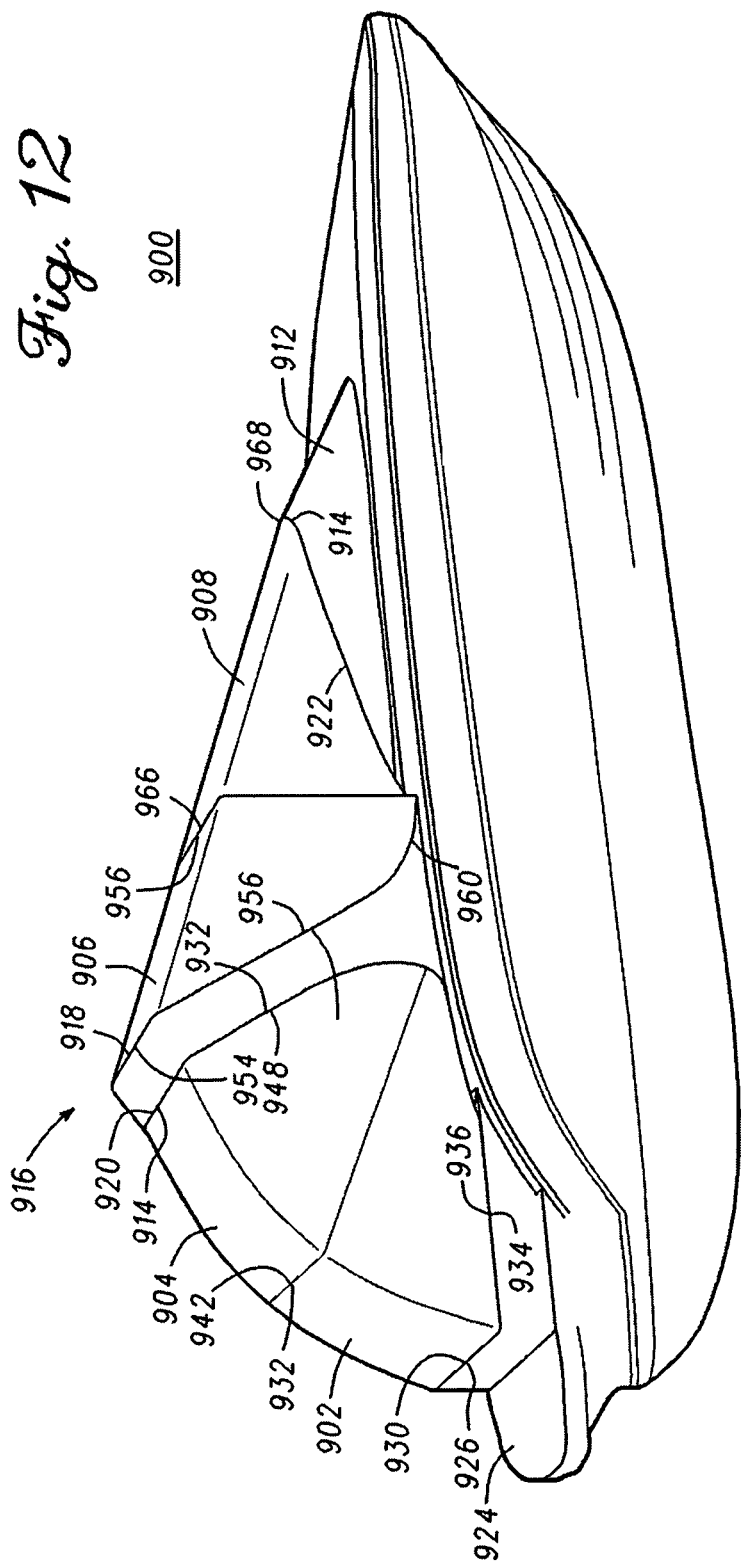

HARDSHELL COVER

FIELD OF INVENTION

The present invention generally relates to covers that can be formed to fit or be part of an enclosure system; and more particularly, to hard covers and hard cover systems that can form and/or be part of an enclose system for products and devices and other semi-open products and devices.

BACKGROUND in today's world, enclosure of products and devices is becoming more important then ever before for a variety of reasons such as, security, a product or products protection from the environmental elements, safety in the handling and/or resistance to damage in the transport of the product or products, ease of moving product or products, energy efficiency in the transport of the products or devices, and the like In one instance, the need to form an enclosure is particularly important when there is a cavity that needs to be enclosed on the product or device and when that cavity can or could store valuables, fragile equipment, or devices. In another instance, the need to form an enclosure is necessitated by covering fragile or sensitive devices.

At present, conventional technology used to cover or enclose products and devices can not be achieved. Conventional enclosure of cavities and formation of a cover is typically achieved by using tarps and cloth like materials. For example, in the case of transporting a reasonably large device such as an engine, turbine, or the like. The device would be mounted on a transport device such as, but not limited to, a buck, a flat bed of a truck, or the like. A tarp or a plurality of tarps would be draped over the device and secured. However, conventional handling of this kind of device has several disadvantages and problems. For instance, use of a tarp or a plurality of tarps does not secure the device from the puncturing or cutting of the tarps by sharp objects which can damage the product which is being covered. The cutting or puncturing of the tarp can be accidental or on purpose as with the case of vandalism.

By way of example, an accidental cutting or puncturing of tarps is illustrated by accidents with fork-lift trucks where the fork punctures the tarp(s). Tarps or even a plurality of tarps, offer little or no protection from misjudgments in the insertion or movement of the forks of a fork-lift. This kind of misjudgment can also occur with the stacking of merchandise. By way of another example, in the case of vandalism or theft, where a person wants to gain access to an object or just to destroy the object, conventional methods and techniques are very ill-equipped to protect against this kind of harm. Thus, using conventional methods and technology does not protect the product or device from harm.

Another disadvantage in using convention technology is that by simply wrapping or draping the device or product with a tarp does not allow for any aerodynamic advantage in transporting of the device. Typically, the excess tarp is blowing in the wind which can have at least to effects. First, the wind flapping of the tarps can cause excessive damage to the product or article that is being covered. This occurs most often when the conventional cover is rubbed against a surface or the object or product. Also, often rain is driven into the seams or gaps of the conventional tarp covering, allowing the interior of the cavity to become wet, moist, and if extended over long periods of time the product and tarp can become moldy. Second, a tarpping system can partially or totally fall off and potentially become a hazard to other drivers. Moreover, another problem and disadvantage of using conventional enclosing technology is that conventional technology does not protect the device from the environmental elements such as rain, hail, or snow from storms, rocks thrown up from the road, and the like.

In yet another example of conventional technology having problems and disadvantages, in the case of having a semi-open cavity such as a boat or the like where a cavity is formed from the perimeter outline of the boat and the inside of the boat. Conventional technology covers this cavity or semi-open cavity by using tarps or cloth like materials. Typically, in the case of a boat, the enclosing of the cavity or semi-open cavity consists of cutting and fitting a canvas material and attaching the canvas material to the perimeter of the boat and having the canvas material stretch across the cavity. Also, once the canvas material is attached to the perimeter typically a restraining device such as a rope, or bungee cord, or the like is wrapped around the canvas material. However, use of this conventional technology has several problems and disadvantages as enumerated previously, as well as others. For instance, even though the canvas material is fitted and secured, over time and use the canvas material becomes loose and flaps and eventually is torn free of at securing points. Also, in the instance of securing your boat at a dock for a short period of time, it is impossible to achieve because of the rapid ability of being able to cut though canvas and tarp materials.

It can be readily seen that conventional covers have several disadvantages and problems. These problems and disadvantages are fundamental in the design and materials use and can not solve the present problems. Therefore a new and enclosure system, materials, and design would be highly desirable.

The foregoing general description and the following detailed description are exemplary and explanatory only and are not restrictive of the invention, as defined in the appended claims.

SUMMARY OF THE INVENTION

In various representative aspects, the present invention provides a substantially rigid hard shell cover having a first foot region, a transition region, a middle region, and a second foot region. A first material layer is formed extending from the first foot region across the middle region to the second foot region. A second material layer disposed on at the first material layer. The second material layer having a first transition region, where the second material layer is thicker in the foot region and thins though the transition region. A third material layer is disposed on at least a portion of the second material layer extending though the transition portion where the thickness of the third material layer is inversely proportion to the thickness of the second material layer.

An exemplary method for fabricating such a device is disclosed as comprising the steps of inter alia: Providing a mold with a working surface and edges. Disposing a first material layer comprising a fiber material and resin material over at least a portion of working surface of the mold. The first material layer decreasing in thickness from the edges through a transition region. Applying a second material layer to at least a portion of the first material layer. The second material layer comprising a foam material over at least a portion of the transition region. The second material layer increasing in thickness though the transition region. The second material layer can be manufactured with reinforcement materials being set in the second material layer.

An advantage of the present invention is to provide a hard shell cover that is rigid and that is light weight.

Another advantage of the present invention is to provide a hard shell cover that is light weight that can cover a large object.

Another advantage of the present invention is to provide a hard shell cover that is rigid and resilient so that when the hard shell cover is placed over an object and/or product the object and/or product is physically protected.

Another advantage of the present invention is to provide a hard shell cover for securing cabin and hold cavities of a boat.

Another advantage of the present invention is that the hard shell covers can me made in modular pieces.

Another advantage of the present invention is that the hard cover can manipulated by either a single person or a small number of people.

Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWING

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent to skilled artisans in light of certain exemplary embodiments recited in the Detailed Description, wherein:

FIG. 4 illustrates a simplified isometric view of an open boat with a hard cover exploded from the open boat and with the hard cover having three sections being interconnected and installed thereon with a first and second portions broken away and removed showing a cavity of hard cover and a cavity of the boat;

FIG. 5 illustrates a simplified isometric view of the open boat with the hard cover setting in place on a surface of the open boat and with the hard cover having sections with portions broken away and removed;

FIG. 6 is a partial sectional illustration taken along arrows 6-6 of FIG. 4 of hard cover showing an embodiment of a junction of sections of the hard covers;

FIG. 7 is a partial sectional view taken along arrows 6-6 of FIG. 4 of hard cover showing another embodiment of junction of two sections;

FIG. 8 is a simplified isometric illustration of a boat having a cabin and a compartment with hard covers exploded therefrom showing the interior of the cabin and an interior of the compartment;

FIG. 9 a simplified isometric illustration of boat having hard covers mounted in place on the cabin and the compartment with arrows 10-10 indicating a partial sectional view as shown in FIG. 10.

FIG. 11 is a simplified isometric illustration of a boat having hard covers exploded from the boat exposing a cabin;

FIG. 12 is a simplified isometric illustration of the boat as shown in FIG. 9 having hard covers set in place over the cabin;

Figure 1:
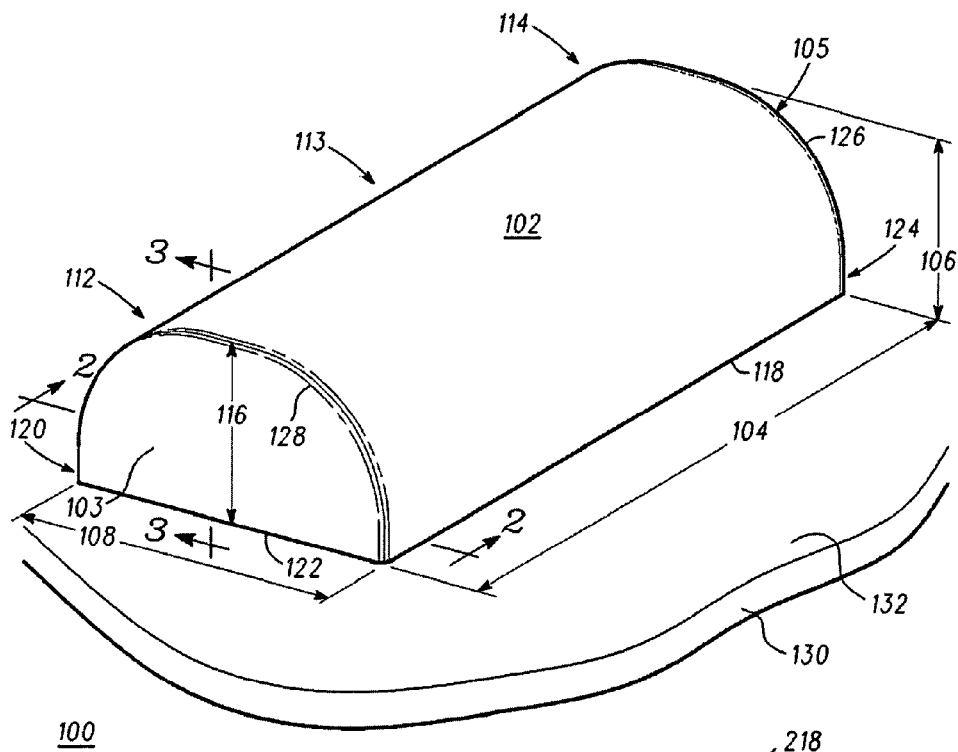
FIG. 1 is a simplified isometric illustration of a hard cover.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used inter alia for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described. Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used inter alia for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described

DETAILED DESCRIPTION OF EXEMPLARY EMBODIMENTS

The following descriptions are of exemplary embodiments of the invention and the inventors' conceptions of the best mode and are not intended to limit the scope, applicability or configuration of the invention in any way. Rather, the following Description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely an article, system and method for providing a hard shell covering device suitably adapted for use cover various objects such as, but not limited to, a variety of objects, boats, engines, and the like applications is presented as a specific enabling disclosure that may be readily generalized by skilled artisans to any application of the disclosed system and method in accordance with various embodiments of the present invention.

Before addressing details of embodiments described below, for the purposes of clarity, some terms are described and defined hereinbelow.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

The term "junction" is intended to mean the meeting of any section with another section.

The term "trailered" is intended to mean any suitable method or technique where a hard cover is place on a periphery of an object or over an object in making ready object for transport.

The term "gel coat" is intended to mean a layer or layers of resinous material that provides an outside coating on a product. It should be understood that other layers of material can be applied to the gel coat layer such as but not limited to sealants, waxes, and the like. In the context of an "open mold" the gel coat layer is the first material layer formed on the mold. It should be understood that a mold release materials are sometime applied to the "open mold" prior to the gel coat layer.

The term "Fiber Reinforced Plastic" is intended to mean any fiber reinforced material combined with a resin to make that is strong, resilient, and durable material.

The term "Fiber Reinforced Material(s)" is intended to mean any suitable material or combination of materials that are combined with a resin or resins to make the fiber reinforced plastic. Fiber reinforced material can be made of any suitable material that can be physically embedded, chemically combined reacted with, or any combination thereof, with the resin. Generally, any suitable fiber reinforced material can be used such as, but not limited to, glass, carbon, aramid, cotton, wool, metal, or the like.

The term "Resin Transfer Molding" (RTM) is intended to mean any resin transfer process such as, but not limited to, Vacuum Infusion, Seaman Composites Resin Infusion, Shell Laminate RTM (Light RTM), Closed Cavity Bag Molding, Multiple Insert Tooling RTM, Zero Injection Pressure RTM, or the like.

The term "buck" is intended to mean any supporting rack or frame with or without wheels that the hard cover can be mounted to.

Figure 3:
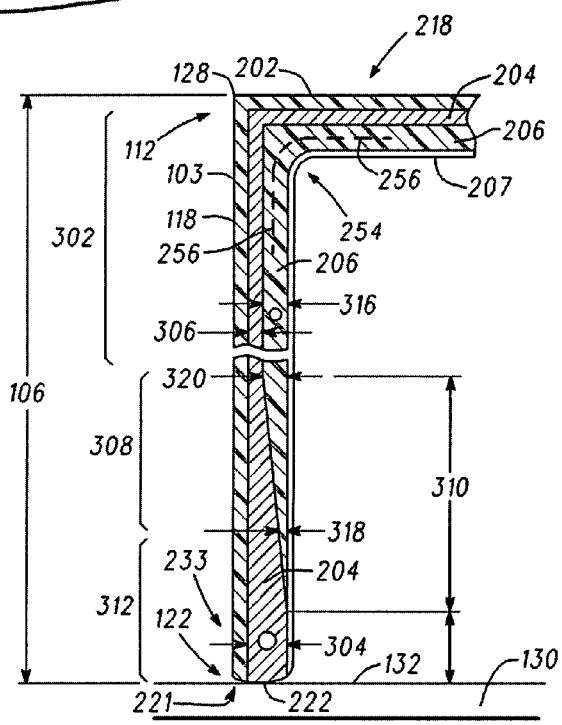
FIG. 3 is a simplified partial sectional illustration view of hard cover taken along arrow 3-3 as shown in FIG. 1.
Figure 2:
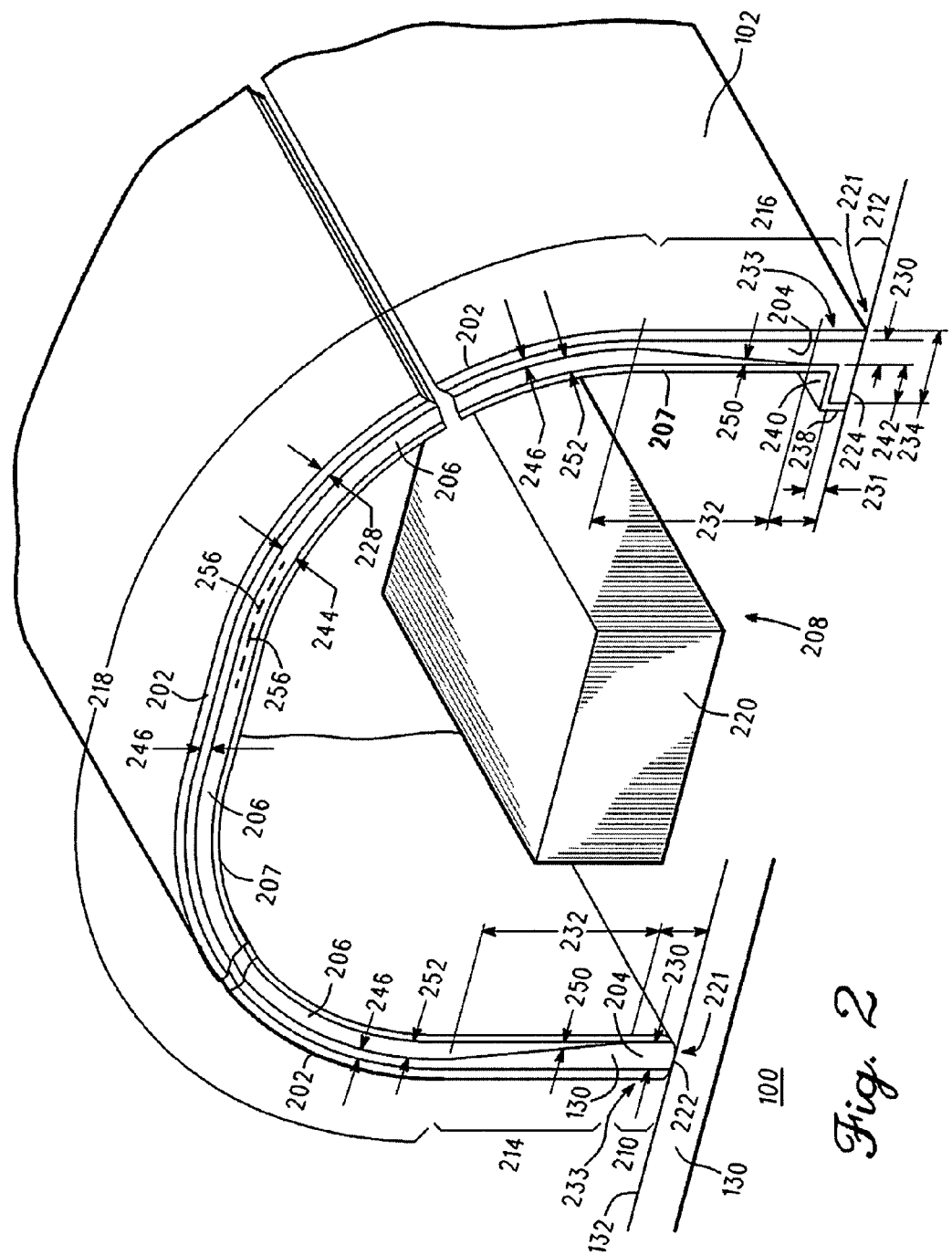
FIG. 2 is a simplified sectional and isometric illustration of hard cover taken along arrows 2-2 as shown in FIG. 1.

Referring now to FIGS. 1, 2, and 3, FIG. 1 is a simplified isometric illustration of a hard cover 100 shaped as a half cylinder, wherein the cylinder (not shown) was cut longitudinally, with edges 118, 120, 122, 124, 126, and 128 with edges 118, 120, 122, 124 resting on a surface 132 of substrate 130. It should be understood that hard cover 100 can have any suitable shape such as, but not limited to, spherical, half spherical, cubical, or the like. Additionally, hard cover 100 can be free formed as is demonstrated, but not limited to, to hard cover boat coverings. Clearly, this could be expanded to any shape and size of any object that needs to be covered. Hard cover 100 includes surfaces 102, 103, and 105, a length 104, a height 106, a width 108, center portion 113, end portions 112 and 114, an arc 116, with arrows 2-2 indicating a sectional view as shown in FIG. 2; FIG. 2 is a simplified sectional representative illustration of hard cover 100 taken along arrows 2-2 as shown in FIG. 1; and FIG. 3 is a simplified partial sectional view illustrating hard cover 100 taken along arrow 3-3 as shown in FIG. 1.

Substrate 130 can be any suitable surface or device that provides surface 132, such as, but not limited to, a bed of a truck, a buck of a trailer, peripheral surfaces of an opening, peripheral surfaces around an opening of a boat such as, but not limited to, a compartment, an engine compartment, or the like. It should also be understood that substrate 130 can be made of any suitable material, materials, or combinations thereof such as organic materials, metal materials, alloyed materials, or any combination thereof.

As shown in FIG. 1, center portion 113 of hard cover 100 forms a convex structure extending from edge 118 to edge 120 with end portions 112 and 114 being integrated into center portion 113 to seal and generate a cavity 208 as shown in FIG. 2. However, it should be understood that in some applications only one end portion needs to be used.

Referring now to FIGS. 1, 2, and 3, width 108, length 104, height 106, and arc 116 having a height 106 describe the outside physical parameters of hard cover 100. However, it should be understood that hardcover 100 is only an example of several variations which are contemplated by this application. Width 108 extending between edges 118 and 120 can be made to any suitable dimension depending upon the application. It should be understood that applications for hard cover 100 are quite variable in size, thereby producing large variations in range. Width 108 for hard cover 100 can range from 2.0 inch (5.08 centimeters) to 60.0 feet (18.29 meters), with a preferred range from 3.0 feet (0.91 meter) to 21.0 feet (6.40 meters); length 108 for hard cover 100 can range from 6.0 inches (15.24 centimeters) to 60.0 feet (18.29 meters), with preferred range from 3.0 feet (0.91 meter) to 26.0 feet (7.92 meters); and height 106 for hard cover 100 can range from 6.0 inches (15.24 centimeters) to 15.0 feet (4.57 meters), with a preferred range from 1.0 feet (0.30 meter) to 10.0 feet (3.048 meters).

As shown in FIGS. 2 and 3, hard cover 100 is made of several material layers such as, but not limited to, material layers 202, 204, 206 and 207 that are formed into hard cover 100. Generally, material layers 202, 204, 206, and 207 of hard cover 100 can be made by any suitable method or technique such as, but not limited to, open molding, closed molding, vacuum molding, resin transfer molding RTM, e.g., but not limited to, light RTM, closed cavity bag molding, or the like. Additionally, it should be understood that methods and techniques taught by U.S. Pat. Nos. 6,796,263, 6,881,370, and 7,160,494 can be used and which are hereby incorporated by reference herein.

Figure 14:
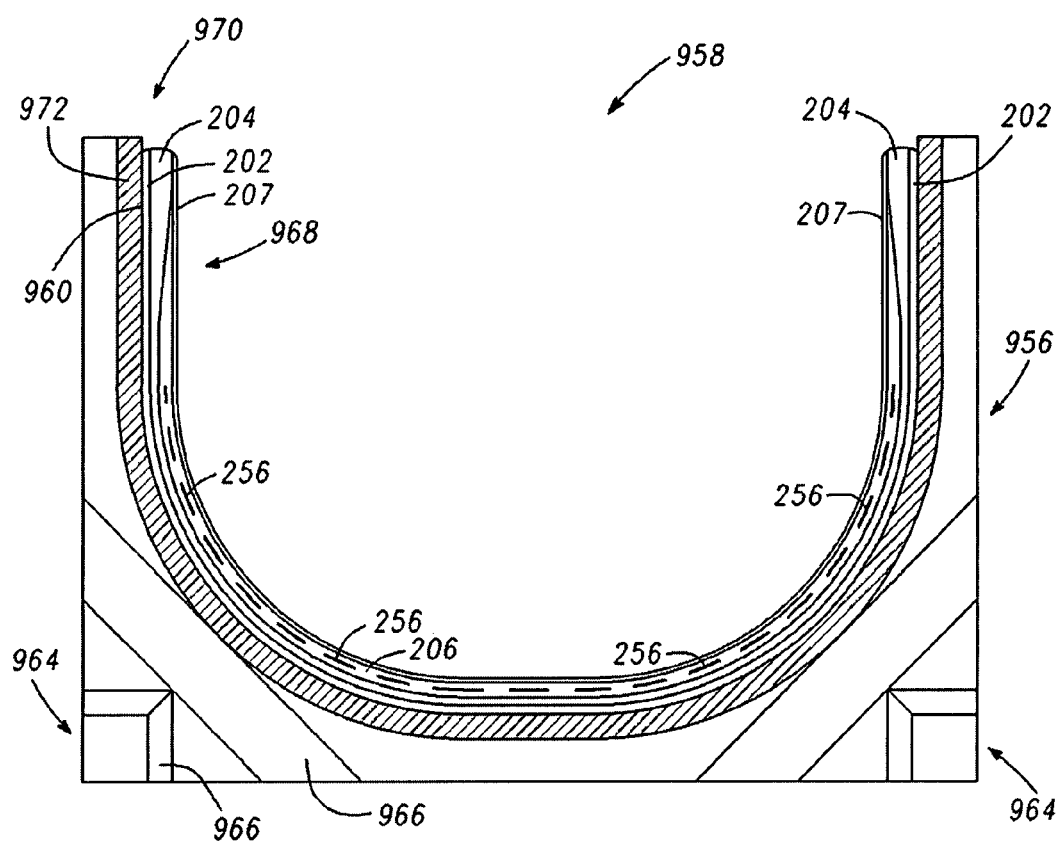
FIG. 14 is a simplified sectional illustration of an example of a mold and an object that is being formed by the mold.

Referring to FIG. 14, FIG. 14 is a simplified sectional illustration of an open mold 956 including, but not limited to, a shape 958, a working surface 960, support structure 964, and braces 966. It should be understood that any system that can generate any desirable shape 958 can be used. Generally, working surface 960 is the surface on which material layers are disposed to generate the work piece 968. Briefly and by way of example, open mold 956 is generated to any desired shape 958. Typically, shape 958 is made by a form 970 having a working surface 960 of open mold 956 is a negative surface image of the desired shape 958 that is being generated. Once the negative surface image of the open mold has been properly prepared, material layers are applied sequentially to the negative surface image and are built up to make a composite material layer 970 having material layers. It should be understood that by selecting the individual materials, the application, processes, and specifications of those materials, a unique composite material can be made having unique performance, strength, weight, and other characteristics. Thus, it should be understood that the composite material may have entirely different qualities and performance levels than that of any of the individual materials alone.

Material layer 202 can be made of any suitable resin used for making a gel coat layer such as, but not limited to, an epoxy resin system, poly ester resin system, e.g., a vinyl ester system or the like. Typically, material layer 202 can be applied by any suitable method or technique such as, but not limited to, hand bushing, rolling, spraying, or the like. As shown in FIG. 2, material layer 202 is the outer most layer of hard cover 100 and provides a first protective layer and esthetic inter-phase between the environment and hard cover 100 and object 220.

While material layer 202 is applied in a reasonably uniform manner, it should be understood that material layer 202 can have some thickness variations. Moreover, it should be understood that by adjusting a thickness 228 characteristics such as, but not limited to, smoothness, pigment uniformity, and like can be altered. Generally, material layer 202 can be made to have any suitable thickness 228. Typically, thickness 228 can range from 13 mills to 27 mills and with a preferred range ranging from 18 mills to 22 mills.

Material layer 204 can be made of any suitable material system such as a fiber reinforced plastic (FRP) system, a carbon fiber material (CFM) system, or the like. Typically, FRP is made of a combination of fiber reinforcement material(s) and a resin. The fiber reinforcement materials can be made of any suitable materials such as, but not limited to, fibers, glass, wool, carbon fiber, or the like. Moreover, core materials such as, but not limited to, balsa wood, divinycel, nida-core, or the like can be sandwich in-between layers of the fiber reinforcement material to add additional strength and stiffness.

Any suitable resin such as, but not limited to, an epoxy resin, a polyester resin, a vinylester resin, a hybrid resin, orthothalic resin, isothalic resin, or the like that will combine with the fiber reinforcement material(s) and make a strong resilient material. The combination of fiber reinforcement material(s) and resin makes material layer 204 a hard, resilient, layer that is difficult to penetrate, break, or shear. Thickness of material layer 204 is achieved and/or adjusted by layering the fiber reinforcement materials and the resin until the desired thickness is achieved. Material layer 204 can be applied to material layer 202 by any suitable method or technique, such as, but not limited to, a hand lay up method, a spray lay up method, or the like.

By way of example only, when using the hand lay-up method, layers of fiber reinforcement material such as, but not limited to, glass matting, glass cut fiber, or the like are applied to a pre-resin coated material layer 202 by hand with a subsequent application of the resin that is also applied by hand. The process is continued until the desired thickness is obtained and allowed to cure. Alternatively, in the spray lay up method, chopped fiber glass fibers and resin are simultaneously applied to material layer 202 via a spray gun to the desired thickness and allowed to cure. It should be understood that subsequent applications of fiber reinforcement material and resin are fully contemplated by the present invention.

Material layer 206 can be made of any suitable foam material system such as, but not limited to, polystyrene (PS), polyurethane, polyethylene, polyisocyanurate, or the like. Typically, material layer 206 is made of an expanding foam material having a density that ranges from about 0.5 pound to about 20.0 pounds per cubic foot, with a preferred density from 4.0 pounds to 7.0 pounds per cubic foot. Material layer 206 can be applied to material layer 204 by any suitable method or technique such as, but not limited to, rolling, painting, spraying, injecting, filling, or the like.

By way of example only, with material layer 206 being made of polyurethane foam system using the brand name of Durafoam manufactured or blended by UCSC. In this particular polyurethane foam system, at least two components are used such as, but not limited to, a polyol resin component and an isocyanate component. The polyol component and the isocyanate component are typically mixed in a spray handle and applied to material layer 202 and allowed to cure and expand to a desired thickness. It should be understood that in some cases, reinforcement materials such as, but not limited to, fibers, metal wire, and the like can be embedded into material layer 206 to provide addition strength and support. It should be understood that the reinforcement materials 256 can be configured in any geometric pattern desired. By way of example only, with the reinforcement material 256 being metal wire, the metal wire can be configured into any geometric pattern desired such as, but not limited to, a square, a hexagon (commonly known as chicken wire), triangles, or straight wire.

Material layer 207 can be disposed on or in part on material layers 204 and 206. Generally, material layer 207 is disposed for both aesthetic and performance reasons. First, material layer 207 is disposed to provide uniform color coating which is more pleasing to the eye. Additionally, material layer 207 can be made to provide protection from Ultra Violet light. Generally, material layer is made of any suitable covering material or paint material, such as, but not limited to, electrometric coating materials, poly urethane coating materials, or an acrylic coating materials, or the like.

As shown in FIGS. 2 and 3, hard cover 100 includes foot regions 210, 212, and 312, transition regions 214, 216, and 308, and center regions 218 and 302. While it should be understood that foot regions 210, 212, and 312 are illustrative of foot regions on hard cover 100, it should also be understood that any and all foot regions can be modified to allow any specific application.

Thickness of material layer 204 in center regions 218 and 302 can be any suitable thickness illustrated by thickness 246 and 306. By way of example, thicknesses 246 and 306 in center regions 218 and 302 can range from, but are not limited to, about 0.0 inch (0.0 centimeter) to about ½ inch (1.27 centimeters), with a preferred range from about 1/32 inch (0.08 centimeter) to about ¼ inch (0.64 centimeter). Thickness of material layer 206 in center regions 218 and 302 can be any suitable thickness 244 and 316, respectively. By way of example, thickness 244 and 316 can range from, but is not limited to, about ¼ inch (0.64 centimeter) to 1.0 inch (2.54 centimeters), with a preferred range of about ⅜ inch (0.95 centimeter) to about ¾ inch (1.90 centimeters). However, it should be understood that in some applications material layer 206 can vary because of the application method or technique used in applying material layer 206 to hard cover 100.

As shown in FIG. 3, edge 128 joins end portion 112 and center region 218 of center portion 113 together. While any suitable method or technique can be employed to join end portion 112 and center region 218 of center portion 113 together, typically, in the present invention end portions 112 and 114, and center portion are molded together. Thus, enabling each material layer 202, 204, 206, and 207 when used or partially used to provide some structural support. By way of example only, structural support of end portion 112 and center portion 112 is produced by the contiguous nature of material layer 204. As shown in FIG. 3, at corner 254 of material layer 206 can be built with a round corner and binds end portions 112 to center region 218 or center portion. However, it should be understood that in some instances material layer 204 at a corner 254 where center portion 113 and either end portion 112 or 114 join at edge 128 can either be join contiguously or be not joined. That is, end portions 112 and 114 could be made separately and physically attached to center portion 113.

As shown in FIGS. 2 and 3, transition regions 214, 216, and 308 illustrate a variable thickness of material layers 204 and 206. Generally, material layer 204 thins diminishes as material layer 204 moves away from foot regions 210, 212, and 312 toward center regions 218 and 302, respectively. Conversely, material layer 206 thickens increases as material layer 206 moves away from foot regions 210, 212, and 302 toward center regions 218 and 302, respectively.

By way of example only, thicknesses 230 and 304 of material layer 204 in transition regions 214, 216, and 308 can range from, but are not limited to, 1/32 inch (0.08 centimeter) to 1/2 inch (1.27 centimeters), with a preferred range from 1/16 inch (0.16 centimeter) to 1/4 inch (0.64 centimeter). Generally, material layer 204 thicknesses 230 and 304 taper and diminish into thickness 246 and 306 of central regions 218 and 302. It should be understood that in some instances, thickness 246 and 306 of material layer 204 can diminish to zero.

Conversely, by way of example only, thicknesses 250 and 252, and 318 and 320, of material layer 206 in transition regions 214, 216, and 308 can range from, but not limited to, 0.0 inch (0.0 centimeter) to 2.0 inches (5.08 centimeters), with a preferred range from 0.0 inch (0.0 centimeters) to 1/4 inch (0.64 centimeter). Generally, material layer 206 increases in thickness from thickness 250 to 252 to thickness 244 of central region 218. Likewise, material layer 206 increases in thickness from 318 to thickness 320 to thickness 316 of center region 302. It should be understood that in some instances, thickness 250 and 318 of material layer 204 can taper down and have a zero thickness. It should be further understood that in some instances material layer 206 extends into center region 218 and that material layer 206 can be diminished to zero.

Distances 232 and 310 illustrate lengths of transition regions, 214, 216, and 308. Generally, while any suitable distance 232 and 310 can be used depending upon the application, distances 232 and 310 typically can range from, but is not limited to, about 6.0 inches (15.24 centimeters) to about 30.0 inches (76.20 centimeters), with a preferred range from about 12.0 inches (30.48 centimeters) to about 24 inches (60.96 centimeters).

As shown in FIGS. 2 and 3, foot regions 210, 212, and 312 allow hard cover 100 to be set in place on surface 132 of substrate 130. Since foot regions 212 and 312 are built similarly, the discussion of foot region 212 will be inclusive of foot region 312. Foot regions 210, 212, and 312 and feet 221 can be made with any suitable configuration or combination of configurations. Typically, ends 233 of layer 204 are formed into foot regions 210, 212, and 312 and feet 221. By way of example only and as shown in FIGS. 2 and 3, foot region 210 and 312 extends from material layer 204 and terminates with a foot 221 having a flat portion 222 that rests on surface 132 of substrate 130. It should be noted that material layer 202 can be included in foot region 210 and 312 either in whole or in part, e.g., material layer 202 can be wrapped around foot 221, thereby integrating material layer 202 into foot region 210 and 312, including feet 221 designs. It should be further noted that material layer 207 can also be included in foot region 210 and 312 either in whole or in part, e.g., material layer 207 can be wrapped around foot 221 as well as, flat portion 222, when desired, thereby integrating material layer 207 into foot region 210 and 312 design. Further, it should be understood that foot regions 210 and 312 can be formed into any desirable configuration.

Also, as shown in FIG. 2 and by way of example only, foot region 212 of hard cover 100 is made of material layer 204 that is made into the shape of an "L" 238. Generally, "L" 238 includes a surface 224 having a width 234, a surface 238 having a thickness 230, and a surface 240 having a width 242. It should be noted and as shown in FIG. 2, that material layer 202 can also be incorporated into "L" 238 configuration. Incorporation of material layer 202 in "L" 238 provides surface 224 with a smoother and a more finished surface. By using "L" 238 configuration, hard cover 100 is more stable and has better weight distribution though surface 224 that runs around edges 118, 120, 122, and 124 of hard cover 100.

Generally, it should be understood that as widths 234 and 242, and thickness 231 increase, stability and stiffness of foot region 212 as well as the overall stability of hard cover 100 increases. Thus, stability and stiffness can be adjusted, in part, by adjusting parameters and dimensions of foot regions 210, 212, and 304. Widths 234 and 242, and thickness 231 can be made to any suitable dimension desirable. Typically, widths 234 and 242 can range, but are not limited to, from 1/2 inch (2.54 centimeter) to 6.0 inches (15.24 centimeters) with a preferred width ranging from 1.0 inch (2.54 centimeters) to 4.0 inches (10.16 centimeters). Thickness 231 can range with any suitable thickness, such as, but not limited to, ranging from 1/16 inch (0.16 centimeter) to 1.0 inch (2.54 centimeters), with a preferred thickness ranging from 1/4 inch (0.63 centimeter) to 3/4 inch (1.90 centimeters).

It should be understood that configuration of foot regions 210, 212, and 312 can be configure to any suitable shape and size. For instance, surface 224 could be configured as a groove. The groove then could fit onto a tongue on surface 132, thereby helping securing hard cover 100 to surface 132. It should be understood that the configurations of the tongue and groove can be reversed. It should be further understood that there are many other configurations that could be used, such as, but not limited to, a clipping device, a snapping devices, or the like. By way of the former example only, the tongue and groove could be made so that the tongue holds onto the groove, thereby providing additional and positive support for holding hard cover 100.

Material layers 202, 204, 206, and 207 each provide certain unique and useful characteristics for building hard covers 100, 402, and 806 and when positioned and used together provide superior performance then when used singly. Therefore, material layers 202, 204, and 206 are uniquely selected, combined, and processed to achieve high performance levels and characteristics such as, but not limited to, structural strength, weight, integrity, ease of manufacturing, penetration resistance, and Ultra Violet light protection.

Material layer 204 provides characteristics such as, but not limited to, rigidity, strength, impact resistance, and ease of use with which to fabricate hard covers 100, 402, 806. However, while the material strength of material layer 204 is excellent, weight of material layer 204 can be excessive. Thus, fabricating hard covers 100, 402, 806 solely out of material layer 204 would make larger hard covers 100, 402, 806 heavy and difficult to work with especially when width 122, length 104, and height 106 of hard cover 100 are large.

Material layer 206 provides characteristics such as, but not limited to, strength, light weight, impact resistance with which to fabricate hard covers 100, 402, and 806. However, while material layer 206 is strong, light weight and impact resistance, material 206 is a brittle material that cracks and breaks when bent or flexed too far. As shown in FIGS. 2 and 3, material layer 206 can be made with reinforcement portions 256 being imbedded into material layer 206. Reinforcement portions can be made of any suitable material such as, but not limited to, metal, plastic, or the like. Additionally, reinforcement portions can have any suitable shape, but not limited to, straight, geometric designs, e.g., octagons, rectangles, triangles, circles, and the like.

However, by combining the properties and certain thicknesses of material layers 204 and layer 206, a strong, rigid, and impact resistant set of material layers are made that are light weight, resistant to penetration, and capable of being manufactured in a cost effective manner.

Additionally, as shown in FIGS. 2 and 3 and by way of example only, making the foot regions 210, 212, and 312 from material layer 204 and having material layer 204 gradually get thinner in transition regions 214, 216, and 308 and by disposing material layer 206 on at least a portion of transition regions 214, 216, and 308 with material layer 206 increasing in thickness in transition regions 214, 216, and 308 to a substantially certain thickness that is reasonably uniform layer into center regions 218 and 302. By combining layers 204 and 206 in transition regions 214, 216, and 308 and having layer 206 extend into central regions 218 and 302, allows hard shell covers 100, 402, 806, 808, 902, 904, 906, and 908 to provide robust structural strength, resistance to shearing, and penetration while having a greatly reduced weight for the specific size of hard covers 100, 402, 806, 808, 902, 904, 906, and 908. Thus, because of the greatly reduced weight hard cover 100, 402, 806, 808, 902, 904, 906, and 908 can typically be placed into position by either one or two people.

Material layer 202 provides several characteristics such as, but not limited to, Ultra Violet protection, ease of use, color selection, and impact and scratch resistance, with which to fabricate hard covers 100, 402, and 806. It should be understood that while layer 202 is important, layer 202 does not provide structural strength to hard covers 100, 402, 806, 808, 902, 904, 906, and 908. However, layer 202 can provided increased life time due to reduction of UV damage during use of hard covers 100, 402, 806, 808, 902, 904, 906, and 908. Also, it should be appreciated that layer 202 can add to the esthetic beauty of to hard covers 100, 402, 806, 808, 902, 904, 906, and 908, by providing a smooth esthetically deep exterior finish that can match the article that is being covered.

Referring now to both FIGS. 4 and 5, FIG. 4 illustrates a simplified isometric view of an open boat 400 with a hard cover 402 exploded from open boat 400 and with hard cover 402 having three sections 404, 406, and 408 being interconnected and installed thereon, having portions 410 and 412 thereof removed showing a cavity 414 of hard cover 402 and a cavity 416 of boat 400; and FIG. 5 illustrates a simplified isometric view of open boat 400 with hard cover 402 setting in place on surface 499 and with hard cover 402 having sections 404, 406, and 408 with portions 410 and 412 broken away and removed.

It should be understood that the basic construction of hard covers 402, 806, 808, 902, 904, 906, and 908 is the same as previously described hereinabove. Hard cover 402 includes a bow portion 418, a stern portion 420, side sections 428 and 430 having ends 454 and 460, and ends 456 and 458, respectively, a center portion 432, a length 422, a width 424, a height 426, and a rim 438 which extends around a perimeter 434 of hard cover 402. Stern portion 420 further includes a stern section 436 having ends 440 and 442 having an exterior surface 444 and an interior surface 446. Sides sections 428 and 430 include external surfaces 448 and 450, internal surfaces 452 and 455, and a plurality of securing devices 462 exemplified by securing devices 464 and 466. Generally, as shown in FIGS. 4 and 5, ends 454 and 456 of sides 428 and 430 are formed to meet at the bow portion 418 of hard cover 402 while ends 424 and 426 are connected and spaced apart by stern section 436. Center portion 432 extends and spans from side section 428 to 430 and from bow portion 418 to stern portion 420.

Boat 400 includes a bow portion 468, a stern portion 470, cavity 416, sides sections 472 and 474 having end portions 490 and 492, and 494 and 496, respectively, internal surfaces 476 and 478, and external surfaces 480 and 482, with a bottom section 484 having an external surface 488 (not shown) and an internal surface 486. Generally, in this particular illustration, boat 400 is formed by having ends 490 and 494 join at bow portion 468, while ends 492 and 496 are joined to a stern section 498 that spaces apart ends 492 and 496. A bottom section 484 is joined to sides section 472 and 474 to provide a water tight seal between side section 472 and 474, stern section 498 and bottom section 484. Also, as shown in FIGS. 4 and 5 and in this particular illustration, side sections 472 and 474 are formed to provide a peripheral surface 499 of cavity 416 (sometimes referred to as a gunwale) upon which hard cover 402 can rest upon.

As shown in FIGS. 4 and 5, rim 438 of hard cover 402 is made to mate with peripheral surface 499 of boat 400. Mating of peripheral surface 499 and rim 438 can be achieved by any suitable method or technique that provides rim 438 of hard cover to meet surface 200 such as, but not limited to, mating of two flat surfaces, mating using a tongue and a groove configuration, mating using a press fitting that snaps together, Velcro, or the like. In many circumstances, the mating of rim 438 and peripheral surface 499 is sufficient for security and safety. However, in other circumstances, once hard cover 402 is positioned in place, the plurality of locking devices 462 can be engaged to secure hard cover 402 to boat 400 providing additional security and protection.

Referring now to FIG. 6, FIG. 6 is a partial sectional view taken along arrows 6-6 of FIG. 4 of hard cover 402 showing junction 602 of sections 404 and 406. Junction 602 can be form into any suitable shape such as, overlapping ends, groove and tongues forms, or the like. As shown in FIG. 6, junction 602 is made of ends 604 and 606 having a length 616 of section 404 and 406, respectively. End 604 of section 404 and end 606 of section 406 can be made of material layers 202, 204, and 206 previously discussed in FIGS. 1, 2, and 3. As shown in FIG. 6, ends 604 and 606 are made to overlap over each other. More specifically, end 604 is made so that bend 608 displaces material layers 202 and 204 and provides an indented region 612; and end 606 is made so that bend 610 is made in the opposite direction and displaces material layers layer 204 and 202 and provides an indented region 614. Ends 604 and 606 are mated by having indented regions 612 and 614 over lap each other. Distance 616 can be any suitable length such as, but not limited to, distance 616 ranging from 1.0 inch (2.54 centimeters) to 6.0 inches (15.24 centimeters) with a preferred range from 1.5 inches (3.81 centimeters) to 3.0 inches (7.62 centimeters). By having the capability of ends 604 and 606 overlap each other, sections 404 and 406 can sized to manageable dimensions and not sacrifice the integrity of having a sole hard cover.

Referring now to FIG. 7, FIG. 7 is a partial sectional view taken along arrows 6-6 of FIG. 4 of hard cover 402 showing junction 602 of section 404 and 406 using a different embodiment. Junction 602 can be formed into any suitable shape such as, overlapping ends, groove and tongues forms, or the like. As shown in FIG. 7, junction 602 is made with ends 604 and 606. End 606 is made with arms 702 and 704 shaped into a "Y" to form a pocket 706, and 604 is made into the shape of a spade that can be inserted into pocket 706 of end 606. Arms 702 and 704 can be made to have any suitable distances 708 and 710 depending upon the specific application. Typically, distances 708 and 710 can range, but are not limited too, from about 1.0 inch (2.54 centimeters) to 6.0 inches (15.24 centimeters) with a preferred range from about 1.5 inches (3.81 centimeters) to 3.0 inches (7.62 centimeters). Additionally, end 604 having a distance 712 can be made to any suitable distance 712 so as to fit into pocket 706. However, typically, distance 712 can range, but is not limited to, from about 1.0 inch (2.5 centimeters) to 6.0 inches (15.24 centimeters) with a preferred range from about 1.5 inches (3.81 centimeters) to 3.0 inches (7.62 centimeters). Width 714 can be any suitable width depending upon the specific application. By way of example only, width 714 can range, but is not limited to, from about 1/16 inch (0.16 centimeter) to 1.0 inch (2.54 centimeters), with a preferred range of about 3/16 inch (0.47 centimeters) to 7/8 inch (2.22 centimeters). By fitting end 604 into pocket 706, sections 404 and 406 can be sized to manageable dimensions without sacrificing the integrity of having a single hard cover.

Use of hard covers exemplified by referring to hard cover 402, during a day of boating there are occasions that mooring boat 400 at the yacht club for picking up additional provisions would be convenient and advantageous; however, during the boating day many personal items such as fishing equipment, water ski equipment, identification, wallets, cushions, and the like are left in cavity 416 unsecured. Thus, when boat 400 is moored at the yacht club, the contents of boat 400 are open, exposed, and vulnerable to theft. However, having hard cover 402 secured in place over cavity 416, significantly improves the security of the contents left in cavity 416 from theft.

In yet another example, in many cases, boats are trailered to and from a waterway or a water body, thereby requiring boat 400 to be transportable by any suitable means such as, but not limited to a pull-along trailler, a big rig trailer, or the like. Typically, rim 438 of hard cover 402 as a whole is placed so that rim 438 mates with surface 499. Once rim 438 and peripheral surface 499 are in place, hard cover 402 is secured in place. Securing hard cover 402 can be achieved by any suitable method or technique such as, but not limited to, strapping hard cover 402 to boat 400, using the plurality of securing devices 462, or the like. Use of hard cover 402 during transportation of boat 400 offers several benefits and advantages such as, but not limited to, making boat 400 more aerodynamic during transportation, increasing fuel efficiency because of better aerodynamics, avoiding the risk of having a soft cover fly off and blinding following driver, and the like. It should be clear that the present examples can be applied to all hard covers.

Figure 10:
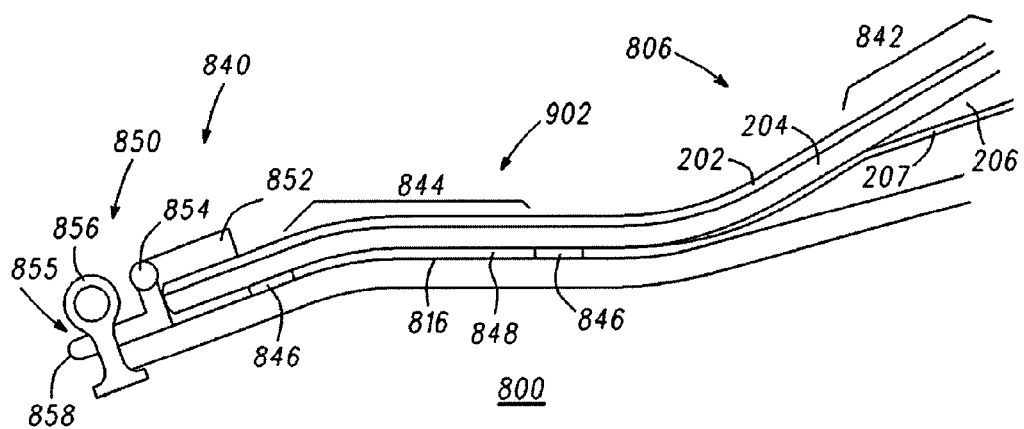
FIG. 10 is a partial sectional illustration of the boat and hard cover taken though arrows 10-10 as shown in FIG. 9 with hard cover being set in place on boat.

Referring now to FIGS. 8 and 9, FIG. 8 illustrates a simplified isometric view of a boat 800 having a bow 828 and a stern 830, a cabin 802 and compartment 804 with hard covers 806 and 808 having rims 832 and 834, respectively, pulled away therefrom, showing an interior 810 of cabin 802 and an interior 812 of compartment 804; and FIG. 9 illustrates a simplified isometric view of a boat 800 having hard covers 806 and 808 mounted in place over cabin 802 and compartment 804 with arrows 10-10 indicating a partial sectional view as shown in FIG. 10. Hard covers 806 and 808 are made of hard composite materials, discussed previously in FIGS. 1, 2, and 3, that are light in weight, but rigid and strong so as to allow hard covers 806 and 808 to span across interiors 810 and 812, respectively, on peripheral surface 816. Additionally, hard covers 806 and 808 can fastened and/or secured by any suitable method or technique, such as, but not limited to a plurality of fastening and/or locking devices 836, illustrated by devices 838 and 850, as well as cleats 878, 880, and strapping device 884. Generally, hard covers 806 and 808 can be made to any suitable size, shape, and height. Typically, shape and sizing is dependant upon a periphery of surface(s) 816 around the interior 810 and interior 812 and the object or objects that are being protected by hard covers 806 and 808.

Windscreen 818 can be made to any suitable or desirable shape, such as, but not limited to, flat, a curve, a plurality of curves, or any combination thereof. By way of example only and using boat 800 as an example, wind screen 818 has a curved shape that partially surrounds interior 810. It should be understood that curvature of wind screen 818 can be to any desirable shape, such as two arcs joined together, or the like. Typically, wind screen 818 has a height 820 with a diminishing height 822 that can go to zero as trailing edges 824 of wind screen 818 moves to stern 830 of boat 800. It should be understood that the diminishing height 822 does not necessarily have to decrease to 0.0, but can be set at any desirable height 822. Typically, heights 820 and 822 can range from 4.0 inches (10.16 centimeters) to 3.0 feet (91.44 centimeters) and 0.0 inches (0.0 centimeters) to 3.0 feet (91.44 centimeters), respectively.

As shown in FIGS. 8 and 9, hard cover 806 is made to cover wind screen 818 having height 820 and with rim 832 resting on peripheral surfaces 816 of cabin 802 of boat 800 and with of hard cover 808 to rest on peripheral surfaces 826 that surround interior compartment 812. Thus, when hard covers 806 and 808 are set in place, wind screen 818, interior 810 including whatever is in interior 810, interior 812 and including whatever is in interior 812 is secured and protected by hard covers 806 and 808. Also, it should be understood that hard cover 806 and 808 can be made to any shape to cover any unusual protuberances such as, but not limited to, a mast, a mega horn, a radar antenna, or the like. Hard covers 806 and 808 can be fastened or secured to boat 800 by any suitable method or technique.

Referring now to FIG. 10, FIG. 10 shows a partial sectional view of boat 800 and hard cover 806 being taken though arrows 10-10 as shown in FIG. 9 with hard cover 806 being set in place on boat 800. As shown in FIG. 10, hard cover 806 having an end portion 840 and transition portion 842 conforms, in part, to peripheral surfaces 816 of boat 800. It should be understood that hard cover 806 can be made to conform, in total or in part to peripheral surfaces 816 on the periphery of a cavity or opening, thereby making an exceptional seal between hard cover 806 and peripheral surface(s) 816. Cushion devices 844, shown in FIG. 10 as pads 846, can be used to create a space 848 between hard cover 806 and surface 816, thereby protecting surface 816 of boat 800. It should be understood that cushion devices 844 could be any suitable cushioning device desired, such as, but not limited to, a coating of rubberized material, a fibrous material, or the like. Pads 846 can be made of any suitable material such as, but not limited to, rubberized or rubber material, a silicone material, a fibrous material, or the like. So as to further seal hard covers 806 and 808 to peripheral surfaces 818 trim-lock can be disposed along rims 832 and 834, thereby further sealing hard covers 806 and 808 as shown in FIGS. 8 and 9.

As shown in FIG. 10, a fastening device 840 can be use to further fasten and/or lock hard cover 806 to boat 800. Typically, fastening device 840 can be made of any suitable fastening device, such as, but not limited to, a hinging device, a clasping device, a cleat device, a strapping device, or the like.

It should be understood that fastening device 840 can be a lockable or an un-lockable device.

By way of example only, fastening device 850 includes a body 852, a body 858, hinge 854, opening 855, and an eyelet 856. As shown in FIG. 10, body 852 is affixed to end portion 840 and joined to body 858 though axial 854. Arrow 860 indicates the motion of body 858. Eyelet 856 can be attached to boat 800 by any suitable method or technology. As shown, eyelet 856 passes though body 858 allowing hard cover 806 to be secured and/or locked though eyelet 856.

As shown in FIGS. 8 and 9, cleats 878 and 880 having openings and 886 are mounted on boat 800. Openings 874 and 876 are made in hard cover 806 so when hard cover 806 is placed on edges 816 of boat 800 openings 884 and 886 of cleats 878 and 880 are exposed, thereby fastening hard cover 806 to boat 800. Typically, openings 884 and 886 and cleats 878 and 880 are made to any suitable dimension that allows cleats 878 and 880 to pass though openings 874 and 876 and exposes openings 884 and 886. When hard cover 806 is positioned on boat 800, a strapping device 884 can be use to secure hard cover 806 to boat 800. Typically, strapping device 882 can be configured to be lockable or not be lockable. Strapping device 882 can be made of any suitable material that can be used such as, but not limited to, straps, elastic cords, webbing, or the like.

Figure 13:
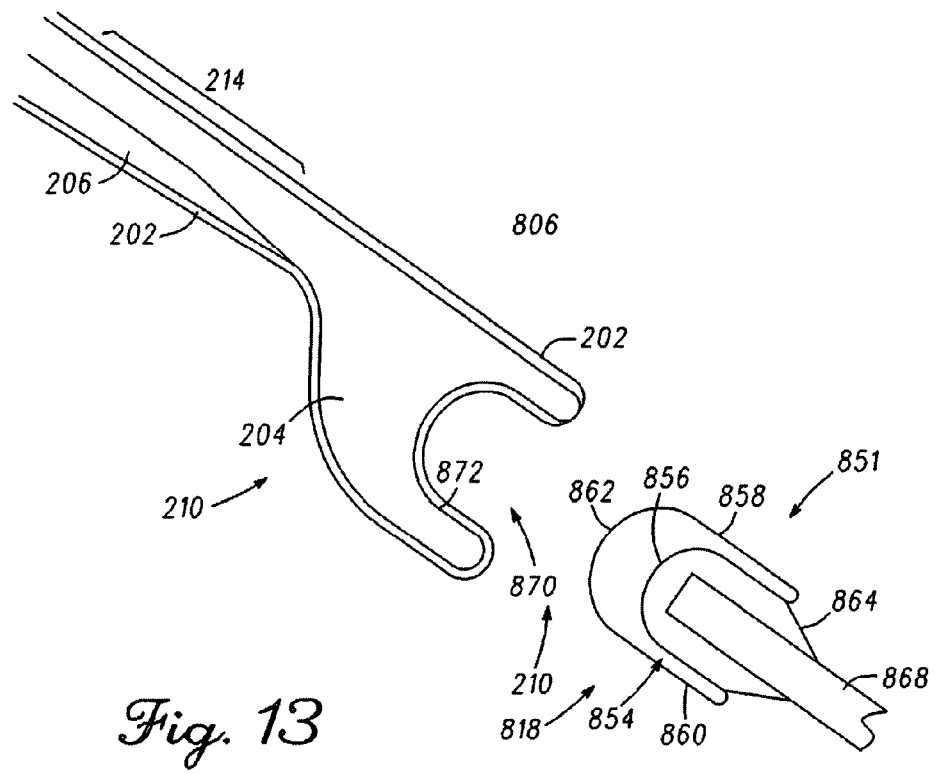
FIG. 13 is a simplified partial sectional illustration shown hard cover exploded from windscreen.

Referring now to FIG. 13, FIG. 13 is a simplified partial exploded sectional illustration of hard cover 806 fitted on wind screen 818. As can been seen, hard cover can includes, but is not limited to, material layers 202, 204, 206, 207, transition region 214, and foot region 210. Material layers 202, 204, 206, and 207, transition region 214, and foot region 210 have been discussed previously and need not be described in detail. It should be understood that foot region 210 has been modified to accept wind screen 818. Wind screen includes, but is not limited to, a molding 851 having a groove 854 with a surface 856, side surfaces 858 and 860, a top surface 862, a grommet 864 with a channel 866, and pane 868.

Molding 851 can be made of any suitable material such as, but not limited to, aluminum, steel plastic, or the like and can be made in any suitable configuration. Generally, molding 851 surrounds pane 868 and provides several features, such as, but not limited to, additional structural strength wind screen 818 as a whole, protection to pane 868, a mounting capability for attaching wind screen 818 to boat 800 (not shown), and a mounting capability for attaching fastening hard cover 806 to wind screen 818. However, it should be understood that while FIG. 13 shows molding 851 as an attachment point, in some instances molding 851 is not necessary for the fastening of hard cover 806 to boat 800.

Generally and as shown in FIG. 13, grommet 864 is disposed into groove 854 of molding 858 with pane 868 being disposed into channel 866. Grommet 864 can be made of any suitable material well known in the art such as, but not limited to, rubber, synthetic rubber, silicon, or the like. Typically, grommet 864 stabilizes pane 868 and cushions the pane from stresses that occur in usage.

As shown in FIG. 13, foot region 210 of hard cover 806 has been made to couple with top surface 862 of molding 851 of wind screen 818, thereby allowing hard cover 806 to couple with wind screen 818. Generally, foot region 210 has been made with groove 870 having surface 872 shaped inversely to the shape of molding 858. In this particular case, surface 872 is shaped in the form of a "U" so that groove 870 can slide over at least a portion of molding 851.

Referring now to FIGS. 8 and 9, with hard covers 806 and 808 fastened and/or secured in place, hard covers 806 and 808 provide superior security performance. Also, in transporting boat 800 on a trailer (not shown) and since hard covers 806 and 808 are conformal and generally fit to the peripheral surface around cabin 802 and compartment 804, cabin 802 and compartment 804 are more secure against vandalism, weather damage, and the like. Further, in a trailering with hard covers 806 and 808 interior 810 of cabin 802 and interior 812 of compartment 804 are free to provide additional storage area. Generally, rims 832 and 834 of hard covers 806 and 808, respectively, reach from peripheral surface 816 and peripheral surfaces 826 to cover and seal underlying cabin 802 and compartment 804 from the environment.

Referring now to FIGS. 11 and 12, FIG. 11 illustrates a simplified isometric view of a boat 900 having hard covers 902, 904, 906, and 908 pulled away from boat 900 exposing cabin 910 and FIG. 12 illustrates a simplified isometric view of a boat 900 having hard cover 902, 904, 906, and 908 set in place over cabin 910.

Boat 900 includes wind screen 912 having peripheral edge 914, a tower 916 having peripheral edge 918 that extends around perimeter of tower 916 and is joined by peripheral edge 914 of wind screen 912, peripheral edge 920 that extends around perimeter of tower 916 and is joined by peripheral edges 922 and 924 along sides of tower 916, with a peripheral edge 926 of a stern section 928 that joins peripheral edges 922 and 924. Hard cover 902 and 904 include edges 930, 932, 934, and 936, 938, and 940; and 942, 944, 946, 948, 950, and 952, respectively. Hard covers 906 and 908 include edges 954, 956, 958, and 960, 962, and 964; and 966, 968, 970, 972, 974, and 976, respectively. Hard covers 902 and 904 are mounted along peripheral edges 920, 922, and 924 of tower 916 and along peripheral edge 926 of stern portion 954. Hard covers 906 and 908 are mounted along edges 918 of tower 916 and along peripheral edge 914 of wind screen 912. As shown in FIG. 11, hard covers 902 and 904, and 906 and 908 are individual separate hard covers that are detachably attached at edges 932 and 942, and 956 and 966, respectively. However, it should be understood that if practicable a single hard cover can be used. In this particular example and with boat 900 being large, spans across peripheral edges 914 and across peripheral edge 918 to peripheral edge 914 at the forward portion of wind screen 912; and from peripheral edge 926 to peripheral edge 920 and from peripheral edge 922 to 924, can be large, thereby making it difficult to manage and mount hard covers 902, 904, 906, and 908 by a single person.

Mounting of hard covers 902 and 904, 906 and 908 to peripherally edges 920, 922, and 924 of tower 916 and along peripheral edge 926 of stern portion 954, and 918 of tower 916 and along peripheral edge 914 of wind screen 912, respectively, can be achieve by any suitable means such as, but not limited to, mating of two reasonably flat surfaces, mating using a tongue and a groove configuration, mating using a press fitting that snaps together, Velcro, or the like.

Also, as shown in FIGS. 11 and 12, hard covers 902 are 904; and hard covers 906 and 908 are attachably detachably joined at edges 932, 936, and 940; edges 942, 946, and 950, respectively and edges 956, 960, and 964 and edges 966, 970, and 974, respectively. Joining and mating of hard covers 902, 904, 906, and 908 can be achieved by any suitable method or technique. As shown in FIGS. 6 and 7 provide examples of several methods of how to join or mated to hard covers.

As shown in FIG. 12, with hard covers 902, 904, 906, and 908 are secured in place on boat 900, hard covers 902, 904, 906, and 908 provide superior environmental isolation and security performance.

In the foregoing specification, the invention has been described with reference to specific exemplary embodiments;

however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

I claim:

1. A hard cover comprising:
   a composite material layer having a shape, a first surface, a second surface, a perimeter, and a foot region having a thickness from 1/16 of an inch to 1.0 inch, the first surface and the second surface spaced apart approximately equal distant from each other with the first surface and the second surface conforming to the shape of the composite material layer,
   the composite material layer including a first material layer having a first thickness, a second material layer having a second thickness, a first transition region and a second transition region having a first variable thickness and second variable thickness, respectively, the first material layer extends from the foot region through the first transition region with the first variable thickness diminishing through the first transition region, the second material layer disposed on at least a portion of the first transition region of the first material layer and extending through the center region with the second variable thickness increasing through the second transition region, and
   the foot region including a substantially flat portion capable of resting on a substrate, wherein the substantially flat portion of the foot region supports the hard cover.

2. The hard cover device as claimed in claim 1, further including:
   a third material layer disposed on a first portion of the first material layer and a second portion of the second material layer and wherein the third material layer is at least partial disposed on the foot region.

3. A hard cover comprising:
   a composite material layer having a shape, a first surface, a second surface, a perimeter, and a foot region, the first surface and the second surface spaced apart approximately equal distant from each other with the first surface and the second surface conforming to the shape of the composite material layer,
   the composite material layer including a first material layer made of a fiber reinforced material having a first thickness, a second material layer having a second thickness, a first transition region and a second transition region having a first variable thickness and second variable thickness, respectively, the first material layer extends from the foot region through the first transition region with the first variable thickness diminishing through the first transition region, the second material layer disposed on at least a portion of the first transition region of the first material layer and extending through the center region with the second variable thickness increasing through the second transition region.

4. The hard cover as clamed in claim 3, wherein the first material layer is made of fiber reinforced plastic.

5. The hard cover as claimed in claim 3, wherein the fiber reinforced material is made of fiber glass and resin.

6. The hard cover as claimed in claim 3, wherein the second material layer is made of a foam material.

7. The hard cover as claimed in claim 6, wherein the foam material is made of polyurethane foam.

8. The hard cover as claimed in claim 6, wherein the foam material is re-enforced with re-enforcement materials.

9. The hard cover as claimed in claim 3, wherein the hard cover further includes a third material layer of gel coat on the first layer.

10. The hard cover device as claimed in claim 3, wherein the end of the first layer is shaped into a foot region.

11. A substantially rigid hard cover having a first height and a central region for covering an opening having peripheral surfaces comprising:
    a first material layer made of fiber reinforced material having a first thickness, a first foot region and a second foot region, a first transition region having a first variable thickness and a second transition region having a second variable thickness, the first and second foot regions including a substantially flat portion capable of resting on a substrate, wherein the substantially flat portion of the first and second foot regions supports the hard cover and the first foot region and the second foot region of the first material layer span the opening and the first and second foot regions rest on the peripheral surfaces of the opening;
    a second material layer having a third thickness, a third transition region with a third variable thickness and a fourth transition region with a fourth variable thickness, the second material layer disposed on at least a portion of the first transition region of the first material layer and on at least a portion of the second transition region of the first material layer, wherein the third and fourth transition regions of the second material layer are coupled together through the central region; and
    a cavity under the second material layer extending from the first foot region to the second foot region.

12. The substantially rigid hard cover device of claim 11, wherein the first foot region further includes a cushioning device.

13. The substantially rigid hard cover device of claim 12, wherein the cushioning device is made from a rubberized material.

14. The substantially rigid hard cover device of claim 11, wherein the first foot region further includes a fastening device.

15. The substantially rigid hard cover device of claim 11, wherein the first foot region further includes a locking device.

16. The substantially rigid hard cover device of claim 11, wherein the first material layer is curved.

17. The substantially rigid hard cover device of claim 16, wherein the curve is convex.

18. The substantially rigid hard cover device of claim 16, wherein the curve is concave.

19. The substantially rigid hard cover device of claim 11, wherein the first material layer is made of fiber reinforced plastic.

20. The substantially rigid hard cover device of claim 11 wherein the second material layer is made of a foam material.

21. The substantially rigid hard cover device of claim 11, wherein the first thickness of the first material layer can range from about 0.0 inch to ½ inch.

22. The substantially rigid hard cover device of claim 11, wherein the second thickness of the second material layer can range from about 0.0 inch to 3.0 inches.

* * * * *